United States Patent [19]

Dang

[11] Patent Number: 5,456,515
[45] Date of Patent: Oct. 10, 1995

[54] VEHICLE WINDOW AND WINDSHIELD COVER

[76] Inventor: Curtis W. Dang, 36965 Second St., Fremont, Calif. 94536

[21] Appl. No.: 291,734

[22] Filed: Aug. 17, 1994

Related U.S. Application Data

[63] Continuation of Ser. No. 49,067, Apr. 19, 1993, abandoned.

[51] Int. Cl.$^6$ .................................................. B60J 11/00
[52] U.S. Cl. ................................ 296/95.1; 160/370.22; 150/166
[58] Field of Search ........................ 296/95.1, 136; 160/370.2 R; 150/166

[56] References Cited

U.S. PATENT DOCUMENTS

| | | | |
|---|---|---|---|
| 2,716,433 | 8/1955 | Rawlings | 150/52 |
| 2,718,912 | 9/1955 | Zimmerman | 150/52 |
| 2,787,311 | 4/1957 | Cohen et al. | 150/52 |
| 2,803,282 | 7/1957 | Wilcox | 150/52 |
| 2,821,248 | 1/1958 | Irvine | 60/368 |
| 2,849,012 | 8/1958 | Cohen et al. | 135/5 |
| 2,874,709 | 2/1959 | Cohen et al. | 135/5 |
| 2,950,749 | 8/1960 | MacDonald | 150/52 |
| 3,021,894 | 2/1962 | La Due | 160/23 |
| 3,992,053 | 11/1976 | Hrytzak et al. | 296/136 |
| 4,049,036 | 9/1977 | Gebhardt | 150/52 |
| 4,174,134 | 11/1979 | Mathis | 296/136 |
| 4,209,197 | 6/1980 | Fischer | 296/216 |
| 4,216,989 | 8/1980 | Tackett | 296/136 |
| 4,406,320 | 9/1983 | Bingham | 160/368 S |
| 4,657,298 | 4/1987 | Yong O | 296/136 |
| 4,662,424 | 5/1987 | Busselmann | 160/331 |
| 4,718,711 | 11/1988 | Rabbit | 296/136 |
| 4,732,421 | 3/1988 | Ross et al. | 296/136 |
| 4,799,728 | 1/1989 | Akers et al. | 296/136 |
| 4,834,446 | 5/1989 | Tung-Chow | 296/136 |
| 4,842,324 | 6/1989 | Carden | 296/136 |
| 4,850,635 | 7/1989 | Lindell | 296/136 |
| 4,862,943 | 9/1989 | Shafia | 160/370.2 |
| 4,863,210 | 9/1989 | Kenon | 296/136 |
| 4,900,081 | 2/1990 | Lee | 296/136 |
| 4,940,276 | 7/1990 | Madison | 296/136 |
| 4,948,191 | 8/1990 | Cao | 296/95.1 |
| 4,952,007 | 8/1990 | Shahrokh | 296/95.1 |
| 4,958,881 | 9/1990 | Piros | 296/98 |
| 4,964,667 | 10/1990 | Reis et al. | 296/95.1 |
| 4,972,892 | 11/1990 | Yeh | 150/166 |
| 5,014,758 | 5/1991 | Stinson | 296/95.1 X |
| 5,029,933 | 7/1991 | Gillem | 296/136 |

FOREIGN PATENT DOCUMENTS

| | | | |
|---|---|---|---|
| 493935 | 7/1976 | Australia | 296/95.1 |
| 1332703 | 6/1963 | France | 296/95.1 |
| 1444149 | 5/1966 | France | 296/95.1 |
| 1290862 | 9/1972 | United Kingdom | 296/95.1 |

*Primary Examiner*—Joseph D. Pape
*Attorney, Agent, or Firm*—Flehr, Hohbach, Test, Albritton & Herbert

[57] ABSTRACT

A shade cover assembly for covering the windows of a vehicle is disclosed. The cover assembly includes a curtain body configured for encircling the upper body portion of the vehicle. The curtain body includes a peripheral upper portion configured to extend around the perimeter of the vehicle roof. The cover assembly further includes a curtain support apparatus for supporting the curtain body in a deployed condition covering the windows. The curtain support apparatus includes a reinforcing structure for reinforcing the curtain body and retaining the upper portion of the curtain body above the windows. A plurality of retention members have one end coupled to the curtain body and an opposite end mountable to the vehicle.

25 Claims, 9 Drawing Sheets

VEHICLE WINDOW AND WINDSHIELD COVER

This is a continuation of application Ser. No. 08/049,067 filed Apr. 19, 1993, now abandoned.

BACKGROUND OF THE INVENTION

1. Field of the Invention

This invention relates in general to covers for protecting and shading a vehicle, and in particular to a shade cover which covers the windows of the vehicle.

2. Prior Art

Automobile operators generally prefer parking their automobile in the shade. Parking the vehicle where it is exposed to direct sunlight will substantially increase the temperature of the vehicle interior. Moreover, parking in an uncovered spot will expose the passenger compartment to the harmful effects of ultraviolet radiation. Many drivers often try to take measures for protecting the interior of their vehicle when a covered or shaded parking space is unavailable. For example, one type of protective device may be positioned against the interior of one or more of the windows. The interior shade devices provide some protection against the harmful effects of the sun. Deploying an interior shade may often be cumbersome and inconvenient, since the driver must negotiate the shade around various components of the passenger compartment, such as the steering wheel, seat backs, gear shift and sun visors. Furthermore, the construction of many vehicle interiors will not adequately support the shade device against the window, resulting in the introduction of unprotected openings through which sunlight and ultraviolet radiation may pass. A protective device which may be conveniently deployed for use and collapsed for storage, and which covers all of the vehicle windows is desirable.

Another type of shading device includes several individual panels which are independently placed on the exterior of the vehicle. The panels substantially cover the windows to reduce the internal temperature of the car and provide protection against damage from ultraviolet radiation. The panel-type device is easier to install than the interior shade since it is applied to the exterior of the vehicle. However, installation is still inconvenient since this type of device typically includes several panels which must be individually installed. The removal of the panel device also involves several steps. Moreover, these exterior devices often require additional installation steps which secure one or more of the individual panels to the vehicle for deterring theft. Thus, a protective cover device which may be efficiently and effortlessly deployed is desirable.

Vehicle covers which are positioned over a portion or all of the vehicle may also be used to shade the vehicle and protect the interior from damaging ultraviolet radiation. One type of cover extends over the entire vehicle, reducing the amount of heat generated within the passenger compartment and protecting the vehicle from becoming scratched. The deployment of the full vehicle cover is substantially time consuming, as the cover must be properly oriented, unfolded and then secured in place. The full cover is often bulky and unwieldy since it includes enough material to cover the entire vehicle. The installation process typically utilizes a significant area surrounding the car, discouraging use of the cover when parking near other vehicles, shrubbery or other obstacles. When folded, the full cover requires substantial storage space. Because of the inconvenience of installation and the substantial storage space required, this type of cover is more suitable for shading the vehicle and protecting the exterior finish when the vehicle is parked for lengthy periods of time.

Another type of cover extends only across the cab of the vehicle, covering the roof and windows. While being somewhat easier to manipulate than the full-sized covers, the partial covers are still quite bulky since they include ample material for covering the roof. The amount of heat permeating through the top of the vehicle is minimal, since the roof is typically insulated. Covering the roof top does protect the vehicle finish and reduce the accumulation of dust and dirt, but has only a slight effect on the internal temperature of the passenger compartment. Moreover, the full or partial covers may not be used with vehicles having roof mounted accessories such as rack assemblies and antennas. A vehicle cover which may be quickly deployed for use and removed from the vehicle for storage, and which requires a minimum amount of storage space, is desirable. A vehicle cover which substantially covers the windows of a vehicle, while exposing the roof is similarly desirable.

A vehicle cover which partially exposes the roof of the vehicle is disclosed in U.S. Pat. No. 2,803,282. The disclosed cover includes a flexible mesh body shaped to extend across the roof of the vehicle and a plurality of flaps which depend from the mesh body to cover the windows. The use of the mesh body slightly reduces the size of the cover; however, the disclosed cover is bulkier and more cumbersome than a cover which substantially exposes the roof of the vehicle. Furthermore, since the mesh body partially covers the roof, it would likely interfere with any roof mounted accessories.

In U.S. Pat. No. 4,209,197, a vehicle cover is disclosed which substantially exposes the roof of the vehicle. The disclosed cover engages the rain gutter at available locations, and includes several magnets for further attaching the cover to the vehicle. The disclosed cover is not suitable for many vehicles, since the aerodynamic design of the newer models substantially reduces or even eliminates the exterior rain gutter. The magnets may not securely hold the cover in position, particularly in windy conditions where the cover will shift and sag, partially exposing the windows and allowing the sunlight to penetrate into the interior of the car. Deployment of the disclosed cover is also time consuming since the magnets and rain gutter attachments must be accurately positioned on the vehicle. A vehicle cover which is retained in place to substantially cover the windows of the vehicle when deployed is desirable.

Many available vehicle covers are partially mounted to the vehicle prior to deployment. Some vehicle cover assemblies include storage devices which are mounted either to the exterior of the vehicle or to the interior of the trunk. Interior mounted storage devices are preferred over those secured to the vehicle exterior, as those are susceptible to theft and often alter the appearance of the vehicle. The covers are typically wound onto a reel or shaft contained within a housing. Installation of the cover on the vehicle is simpler than with those not including storage devices, since the covers are properly oriented relative to the vehicle. When not in use, the cover is retained within the storage container. The storage containers are generally somewhat large since they must accommodate the bulky cover body, significantly reducing the available trunk capacity when mounted to the trunk interior. Furthermore, these covers are less versatile since they may not be suitable for some vehicle models, such as utility vehicles, minivans and station wagons. Since it is securely mounted to the vehicle, removal of the storage compartment is substantially time consuming and inconvenient. A vehicle cover assembly including a storage device which may be effortlessly and efficiently detached from the vehicle and which occupies a minimum amount of storage space is desirable. Similarly, a vehicle cover assembly which may be used with most types of vehicle models is desirable.

Accordingly, a primary object of the present invention is to provide a shade cover assembly for a vehicle which substantially covers the windows of the vehicle.

A further object of the present invention is to provide a shade cover assembly for a vehicle which substantially covers the windows of the vehicle while substantially exposing the vehicle roof.

Another object of the present invention is to provide a shade cover assembly in which the curtain body is retained in place covering the vehicle windows when the cover assembly is deployed.

Yet another object of the present invention is to provide a shade cover assembly which is secured to the vehicle, thereby deterring theft, when the cover assembly is deployed.

Yet another object of the present invention is to provide a shade cover assembly which includes a storage device removably mountable to the vehicle for storage of the curtain body.

An additional object of the present invention is to provide a shade cover assembly which may be conveniently and efficiently deployed for use and removed for storage.

A more general object of the present invention is to provide a shade cover assembly which may be inexpensively and efficiently manufactured and which may be used with several types of vehicles.

SUMMARY OF THE INVENTION

The shade cover assembly of the present invention is particularly suitable for covering the windows of a vehicle that includes a roof, an upper body or cab portion having a plurality of windows, and a lower body portion. The cover assembly comprises a curtain body which is configured for encircling the upper body of the vehicle and substantially covering the windows. The curtain body includes a peripheral upper edge defining an opening of sufficient size to substantially expose the roof of the vehicle, and a peripheral lower edge spaced from the upper edge. A curtain support apparatus supports the curtain body in a deployed condition covering the windows, substantially preventing the passage of sunlight and ultraviolet radiation into the vehicle interior. The curtain support apparatus reinforces the curtain body around the roof opening to thereby retain the upper edge of the curtain body above the top of the windows. In one aspect of the present invention, an elongated cord member is mounted to the curtain body substantially around the opening to reinforce the upper edge. A plurality of retention members each having opposed first and second ends extend between the upper and lower edges of the curtain body. The first ends of the retention members are positioned adjacent the upper edge of the curtain body, while the second ends are mountable to the vehicle. The retention members transfer tension from the reinforced upper edge of the curtain body to the vehicle.

In a preferred modification, the shade cover assembly further includes an anchoring device coupled to the curtain body for securing the curtain body to the vehicle when deployed. The anchoring device is retained within the storage compartment of the vehicle. In one aspect, a reel device is used to anchor the curtain body to the vehicle. The reel device is removably mountable to the storage compartment the vehicle, with the curtain body being wound onto the reel device for storage. In another aspect, at least one retaining tube member is held within the storage compartment to anchor the curtain body to the vehicle.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

A shade cover assembly constructed in accordance with the present invention is illustrated in FIGS. 1–7. The shade cover assembly 20 is particularly suitable for use with a vehicle 10 having a roof portion 12, an upper body portion 14 with a plurality of windows 16 and a lower body 18. For convenience, the vehicle referred to in the description of the present invention is a sedan with a trunk compartment; however, it is to be understood that the cover assembly may be applied to other types of vehicles, such as a minivan or hatchback. Shade cover assembly 20 includes a curtain body 22 encircling the upper body portion 14 of the vehicle. As is shown particularly in FIGS. 1 and 3, curtain body 22 includes a front stretch extending across the front windshield, a back stretch extending across the rear window and side stretches extending across the side windows of the vehicle, providing the curtain body with a generally quadrilateral-shaped horizontal cross section. The curtain body includes spaced upper and lower edges 24 and 26, with the peripheral upper edge 24 defining an opening 28 exposing the vehicle roof. The opening 28 is preferably of a sufficient size to substantially expose the vehicle roof, with the curtain body 22 primarily covering the windows 16. A pair of mirror openings 27 are formed near the lower edge of the curtain body. When the curtain body is deployed, the external side mirrors 29 are inserted through the mirror openings 27. The curtain body 22 prevents the unrestricted passage of sunlight and ultraviolet radiation through the vehicle windows, preventing undesirable heating of the passenger compartment.

When left exposed to the sun, the interior of the vehicle is essentially heated by the sunlight and ultraviolet radiation streaming through the vehicle windows. Only a small amount of heat if any passes through the roof of the vehicle and into the passenger compartment, particularly when the vehicle is parked for only a few hours. Thus, leaving the roof portion 12 uncovered while covering the windows will not noticeably increase the internal temperature of the vehicle. The cover assembly is easier to manipulate for deployment and storage, since a minimum amount of material is used for the curtain body. Since less material is required, the manufacturing costs are significantly reduced.

Figures 1, 2:
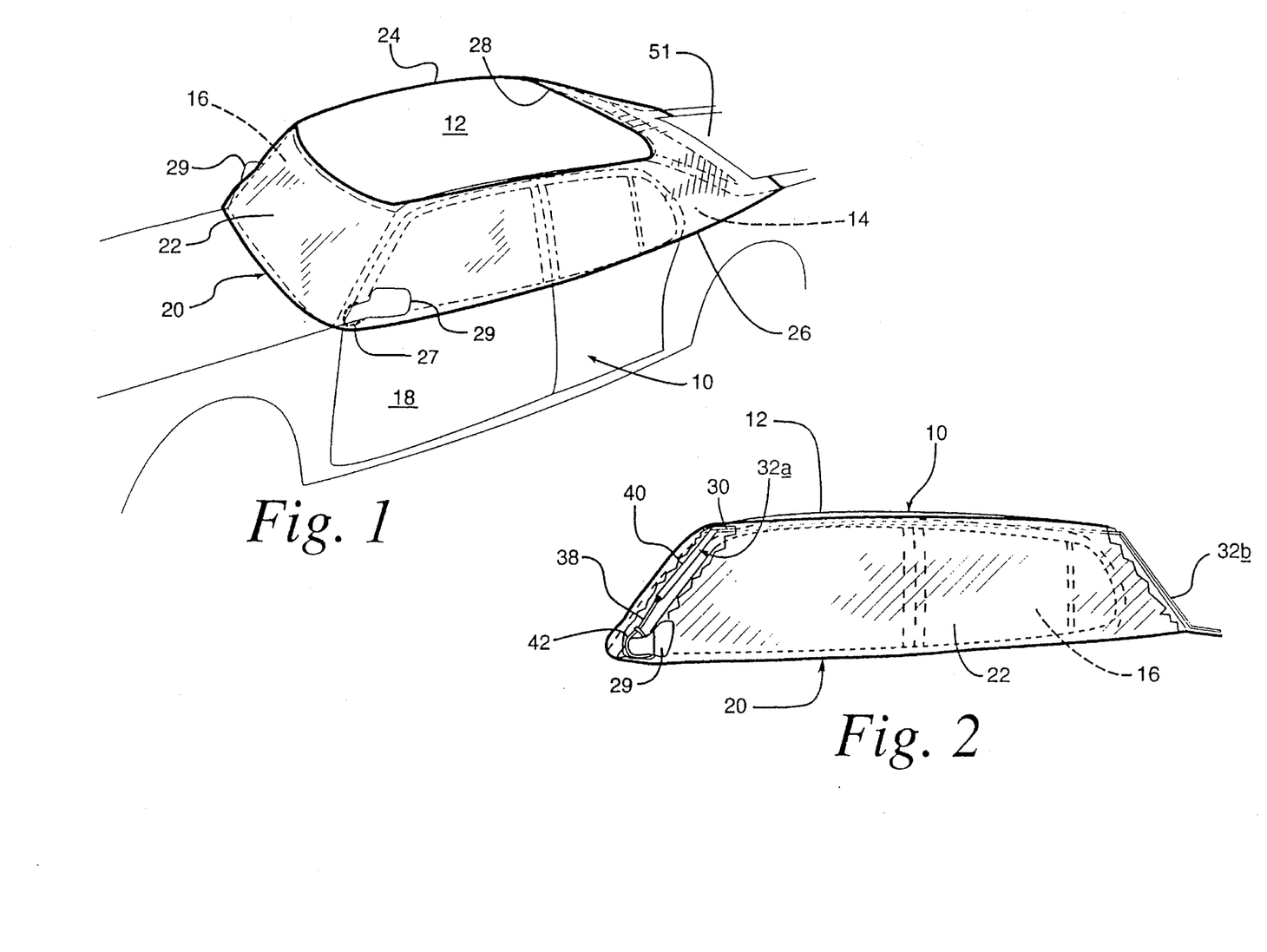
FIG. 1 is a perspective view of a shade cover assembly constructed in accordance with the present invention, shown installed on a vehicle.
FIG. 2 is a fragmentary side view of the shade cover assembly of FIG. 1, shown installed on a vehicle with the curtain body partially broken away to reveal the curtain support apparatus.
Figure 3:
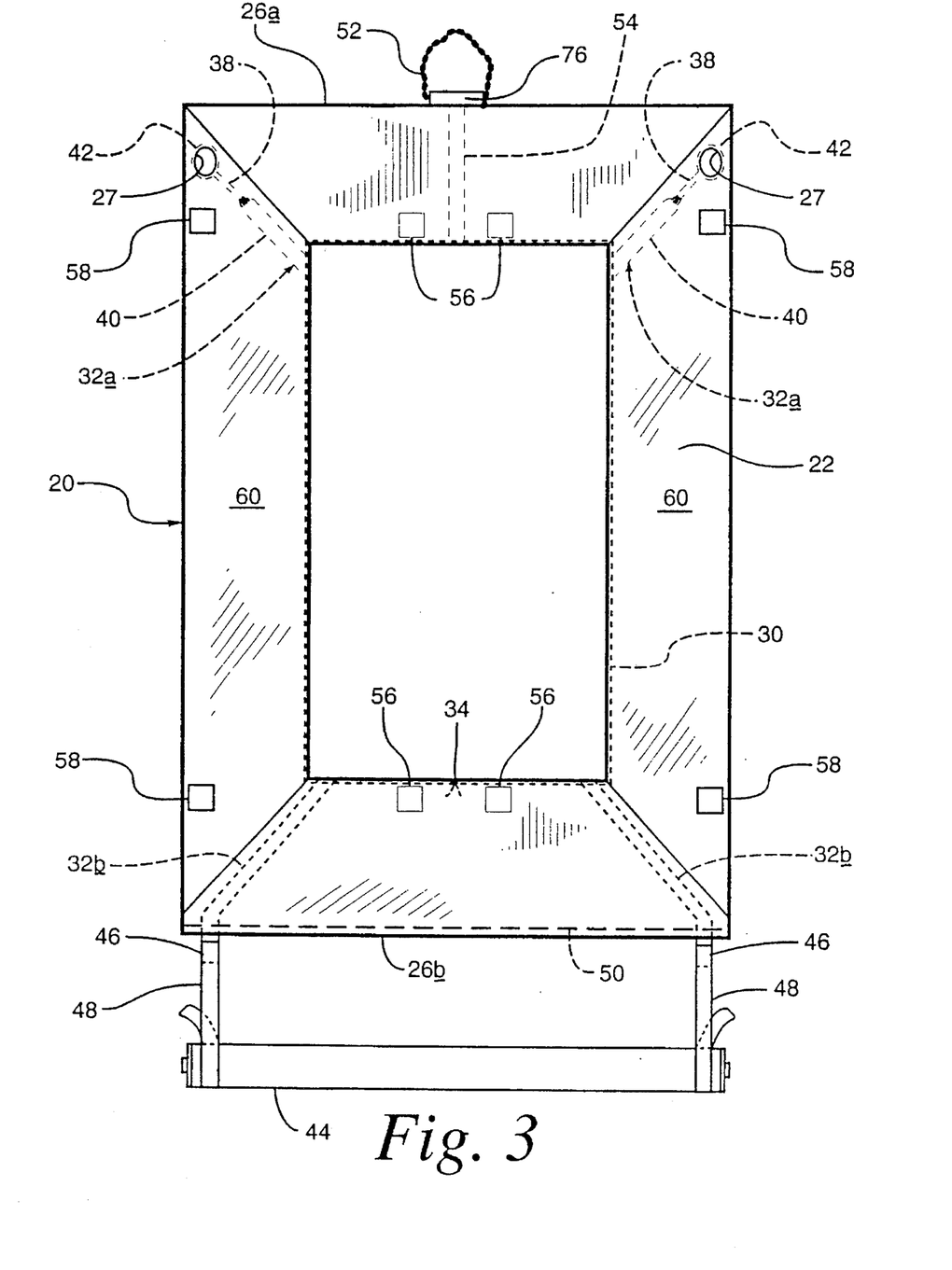
FIG. 3 is a top plan view of the shade cover assembly of FIG. 1.

Shade cover assembly 20 further includes curtain support means for supporting the curtain body 22 in a deployed condition covering the windows 16 to substantially obstruct the passage of sunlight and ultraviolet radiation into the vehicle interior. One such curtain support means is provided by reinforcing means, such as an elongated cord member 30, and a plurality of retention members 32a and 32b (FIG. 2). The cord member 30 is secured substantially around the opening 28 along the upper portion or upper edge 24 of the curtain body 22. In the present form, the cord 30 is inserted into a casing formed by the hem of the upper edge 24. Alternatively, the cord member may be stitched in place or other known means may be used to secure cord member 30 to the curtain body. The reinforcement provided by the cord member retains the curtain body in place against the upper body 14 of the vehicle, preventing any slippage or sagging which would expose a portion of the windows. As is shown in FIG. 3, cord member 30 is provided with a drawstring knot 34 which may be used to adjust the effective length of the cord member. When initially using the cover assembly 20, the user may adjust the cord member to ensure the curtain body is held above the windows. With the adjustable cord member the cover assembly 20 may also be adapted for use with several vehicle models. For optimum reinforcement, the cord member 30 is preferably substantially inelastic and resistant to stretching when the curtain body is deployed. While the preferred modification utilizes an adjustable inelastic cord member, other reinforcing means may be substituted for the cord 30 such as reinforced stitching or other support materials.

As is shown particularly in FIG. 2, retention members 32a and 32b extend between the upper and lower peripheral edges 24 and 26. One end of each retention member is positioned near the upper edge 24, while the opposite end is mountable to the vehicle. The retention members transfer tensile stresses from the reinforced upper edge of curtain body 22 to the vehicle to further secure the curtain body in place when deployed. The retention members 32a and 32b also ensure the cord member is held taut and positioned properly around the roof portion 12 of the vehicle, increasing the stability of the curtain body around the opening 28. In the present form, the upper end of each of the retention members is attached to the cord member 30; however, in other modifications of the invention the retention member may instead be coupled directly to the curtain body. When the cover assembly 20 is deployed, the lower ends of the front retention members 32a are mounted to the exterior side mirrors 29, while the rear retention members 32b are anchored inside the trunk compartment, generally designated 36.

As is shown particularly in FIGS. 2 and 3, front retention members 32a include an elastic portion 38 connected to a strap portion 40. The distal end of the elastic portion is formed with a loop 42 which is slipped onto the side mirror 29. The front retention members 32a are preferably stretched taut when the curtain body 22 is deployed and the loops 42 are slipped around the side mirrors 29, with the curtain body 22 being held against the upper body of the vehicle. In the present form, the elastic portion 38 is secured to the curtain body with loop 42 positioned around the mirror opening 27. The deployment of the cover assembly 20 is simplified, since the front retention members 32a and the mirror openings 27 are simultaneously mounted to the vehicle. Securing the lower end of retention members 32a to the curtain body offers the additional advantage of holding the lower edges 26 against the vehicle during windy conditions.

Rear retention members 32b are each coupled to a retraction roller 44 via quick disconnect attachments 46 and anchoring straps 48. In the present form, the attachments 46 are provided by complementary hook and loop material fasteners. Other known means for releasably coupling retention members 32b and anchoring straps 48 together may be substituted for the hook and loop fasteners, for example snaps, buckles and the like. The curtain body 22 may be easily detached from the roller 44 for cleaning, servicing or necessary repairs by disengaging attachments 46. As is discussed further in relation to FIGS. 5–7, roller 44 is held within the trunk of the vehicle when the curtain body is deployed, anchoring the rear retention members 32b to the vehicle storage compartment. Securing the retraction roller and the attached ends of the retention members 32b within the trunk compartment protects the cover assembly 20 from theft. For additional security, a rope 50 is provided along the rear lower edge 26b of the curtain body. The rope 50 has a diameter sufficiently large to prevent passage of the rear lower edge 26b through the small gap between the trunk lid 51 and the body of the car. The rope 50 further secures the attachments 46 and the anchoring straps 48 within the trunk compartment, providing a significant deterrent against theft as the curtain body 22 may not be unlawfully removed from the vehicle without being damaged.

Cover assembly 20 also includes a handle 52 mounted to the front lower edge 26a for facilitating deployment of the curtain body 22. A front reinforcing strap 54 extends between the upper edge 24 of the curtain body and the handle 52, thereby coupling the handle to the cord member. The user grasps the handle to pull the curtain body 22 across the vehicle and deploy the cover assembly. The forces applied on the assembly 20 during installation are carried by the handle, the reinforcing strap 54 and cord member 30, substantially preventing tearing or straining of the curtain body.

Figure 4:
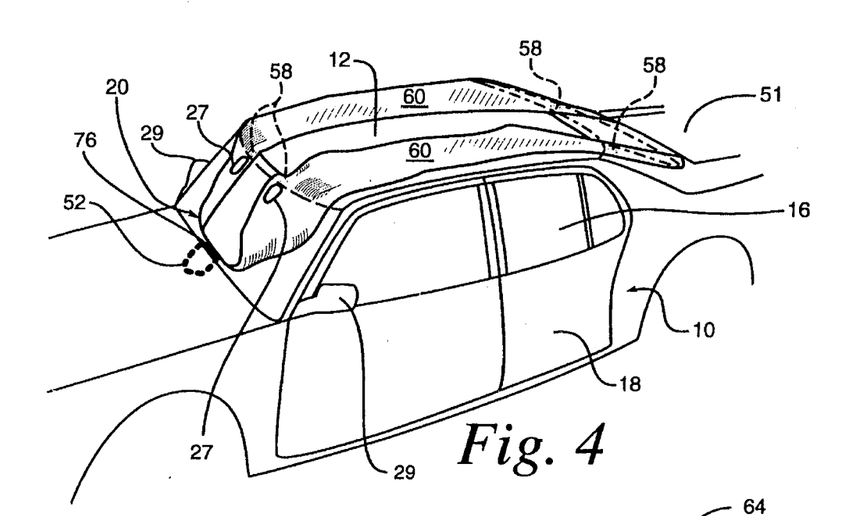
FIG. 4 is a perspective view of a shade cover assembly of FIG. 1 in a partially folded position, shown mounted to the vehicle.

Cover assembly 20 further includes means for securing the curtain body in a partially folded position, such as hook and loop material fasteners 56 and 58. When partially folded, the curtain body may be more efficiently deployed and removed for storage. As is shown in FIG. 4, the side panels 60 of the curtain body are folded towards the vehicle roof and the fasteners 56 and 58 are coupled together to hold the curtain body in the partially folded position. Once it has been folded, the curtain body may be pulled across the roof portion 12 towards the rear of the vehicle and neatly wound onto roller 44. When the curtain body is deployed, it is pulled across the vehicle and the fasteners 56 and 58 are disengaged placing the side panels 60 in position for attachment to the vehicle. Although partially folding the curtain body prior to removal is generally desirable, the curtain body may instead be removed from the vehicle without being folded. With the roof-sized opening 28 and attached support structure, the curtain body is easy to manipulate and position on the vehicle as the handle 52 is pulled across the roof portion 12.

Figure 5:
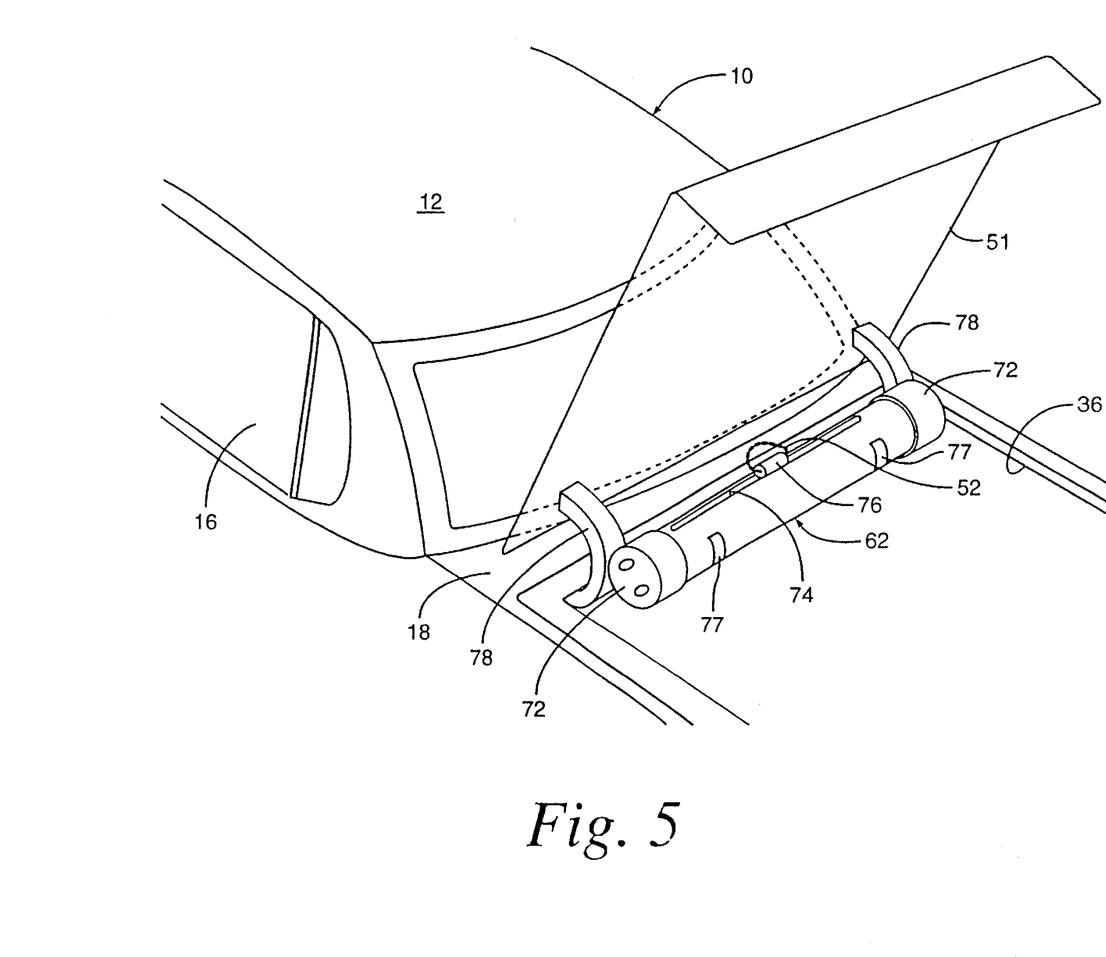
FIG. 5 is a perspective view of shade cover assembly of FIG. 1 in a retracted position, shown mounted to the vehicle.
Figure 6:
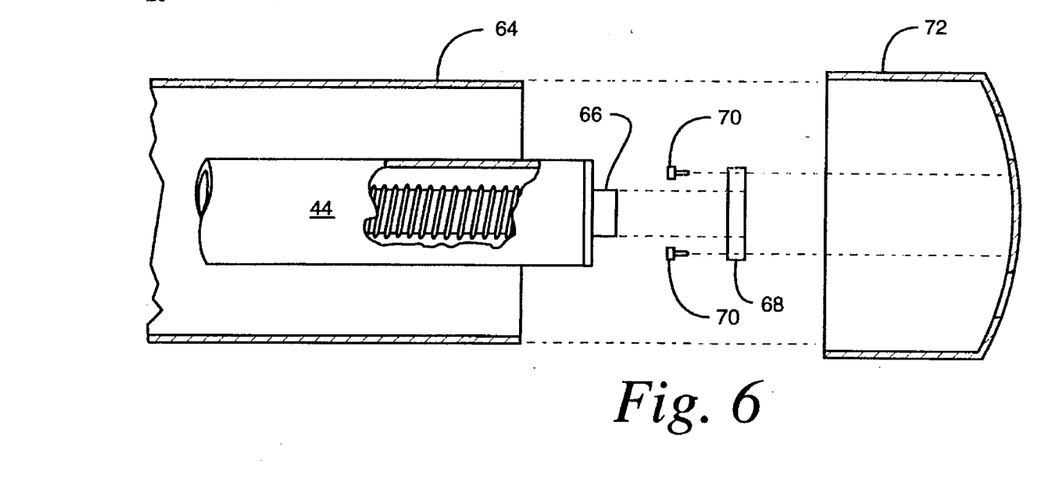
FIG. 6 is an exploded view of the reel assembly of the shade cover assembly of FIG. 1, shown partly in cross section.
Figure 7:
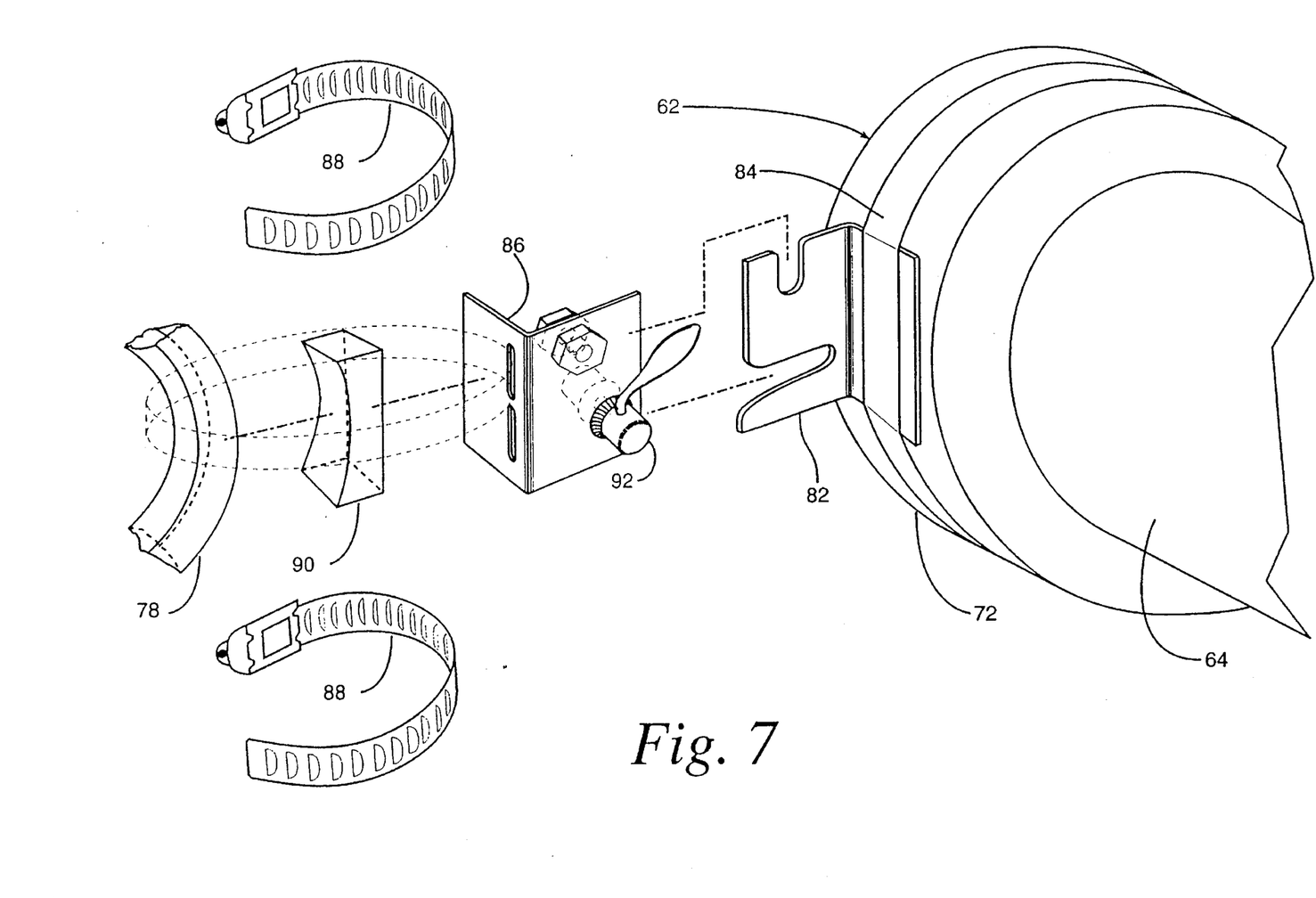
FIG. 7 is an enlarged, exploded fragmentary perspective view of the reel assembly of FIG. 1, showing the installation on a trunk compartment hinge.

Turning to FIGS. 5–7, reel assembly 62 and the retraction roller 44 will be discussed in greater detail. Reel assembly 62 includes a roller housing 64 which contains the retraction roller 44. In the present form, roller 44 is substantially similar to a conventional household window shade. The roller 44 has a projecting tab 66 on either end, with each tab 66 being inserted into supports 68. A number of fasteners 70 secure the supports 68 to end caps 72, which are in turn press fit onto opposite ends of the housing 64. The end caps 72 may be adjusted relative to the housing to ensure free rotation of roller 44. The anchoring straps 48 couple the curtain body 22 and the rear retention members 32b to the roller 44.

In the present form, the distal ends of each strap 48 are wrapped around the roller and secured in place. Complementary hook and loop fasteners (not shown) are respectively mounted to the roller and anchoring strap to attach strap 48 to the retracting roller. The hook and loop fasteners prevent rotation of the roller relative to the anchoring straps, enabling the curtain body to be wound onto the roller 44. The roller housing 64 includes a longitudinal elongated opening 74 providing access to the roller. The curtain body 22, cord member 30 and retention members 32a and 32b pass through the elongated opening for deployment and retraction of the curtain body. Handle 52 includes a stop body 76 which is larger in size than the elongated opening 74, preventing retraction of the handle into the roller housing 64. A hook material fastener 77 (FIG. 5) has been applied to the outer surface of roller assembly 62 for engaging the loop material fastener on the anchoring straps. When the attachments 46 are disengaged and the curtain body 22 removed for cleaning or servicing, the unsecured ends of the anchoring straps are coupled to the hook fasteners 77 on the exterior of the housing 64 to prevent retraction of the anchoring straps into the interior of the reel assembly 62.

Reel assembly 62 is releasably mounted to the hinges 78 within the trunk and oriented with the elongated opening opposing the gap between the trunk lid and the vehicle body. As is shown in FIG. 7, a female quick release bracket 82 is clamped onto the end cap 72 by a circular clamp 84. The bracket 82 engages a male quick release bracket assembly 86 which is secured to the trunk hinge 78 by a pair of circular clamps 88. An insulation pad 90 sandwiched between the bracket assembly 86 and the hinge 78 at least partially absorbs the operational forces to reduce wear on the components. The bracket assembly 86 includes a locking member 92 which is rotated in one direction to secure brackets 82 and 86 together, mounting the reel assembly 62 to the vehicle. While only one end cap 72 is shown in FIG. 7, in the preferred form both end caps 72 of the reel assembly are mounted to the hinges 78. The reel assembly 62 may be easily disengaged by rotating the locking member 92 in the opposite direction to release the bracket assembly 86 from the bracket 82. The reel assembly 62 may thereby be quickly and effortlessly detached from the hinges 78 and removed from the trunk 36. Thus, the cover assembly 20 may be conveniently removed if it occupies needed trunk space.

When the vehicle is parked in a space exposed to the sun, the operator may efficiently shade the vehicle interior using the cover assembly 20. The operator opens the trunk lid 51, gaining access to the trunk, and grasps the handle 52 and passes it through the gap between the trunk lid and the body of the vehicle. By gripping the handle and walking along the length of the vehicle, the curtain body may be pulled across the roof portion 12 of the vehicle until the mirror openings 27 are positioned to the front of the side mirrors 29. The handle is then released and the retraction roller 44 allowed to retract slightly and then lock, drawing the curtain body towards the rear of the vehicle. Mirror openings 27 and elastic loops 42 are then slipped onto each of the side mirrors 29, and the cord member 30 and opening 28 are centered on the roof portion of the vehicle. The rear retention members 32b are pulled forward slightly to release the spring lock of the retraction roller 44. The trunk lid is then closed, securing the rear lower edge 26b between the lid 51 and the body of the vehicle and holding the curtain body against the windows. If desired, the windshield wipers may be positioned on top of the front lower edge 26a to prevent the curtain body from billowing in the wind. When deploying the cover assembly 20 in the wind, the curtain body 22 should be pulled towards the front of the vehicle until mirror opening 27 just reaches the side mirror 29. The mirror opening is then slipped onto the side mirror, and the curtain body is deployed as described above.

When removing the curtain body for access to the vehicle interior, the user initially removes the mirror openings 27 and elastic loops 42 from the vehicle side mirrors 29. If necessary, the front lower edge 26a is removed from beneath the windshield wiper. The user may then partially fold the curtain body and engage fasteners 56 and 58 if desired. The curtain body 22 is pulled slightly towards the front of the vehicle to activate the retraction roller 44. The curtain body 22 is then guided towards the trunk compartment and wound onto the retraction roller of the reel assembly 62. With the reel assembly of the present invention, the curtain body 22 is conveniently and efficiently deployed for use and removed for storage.

In the present form, the reel assembly 62 includes a roller similar to that found in a standard window shade. Other means may be substituted for the retraction roller, such as a spring actuated reel, a hand crank reel or a motorized reel. Reel assembly 62 is preferably mounted between the hinges 78; however, the assembly may alternatively be mounted to the trunk lid 51 or to the interior walls of the trunk compartment 36. Similarly, the quick release bracket 82 and bracket assembly 86 may be replaced by other known means for releasably attaching one component to another.

Figure 8:
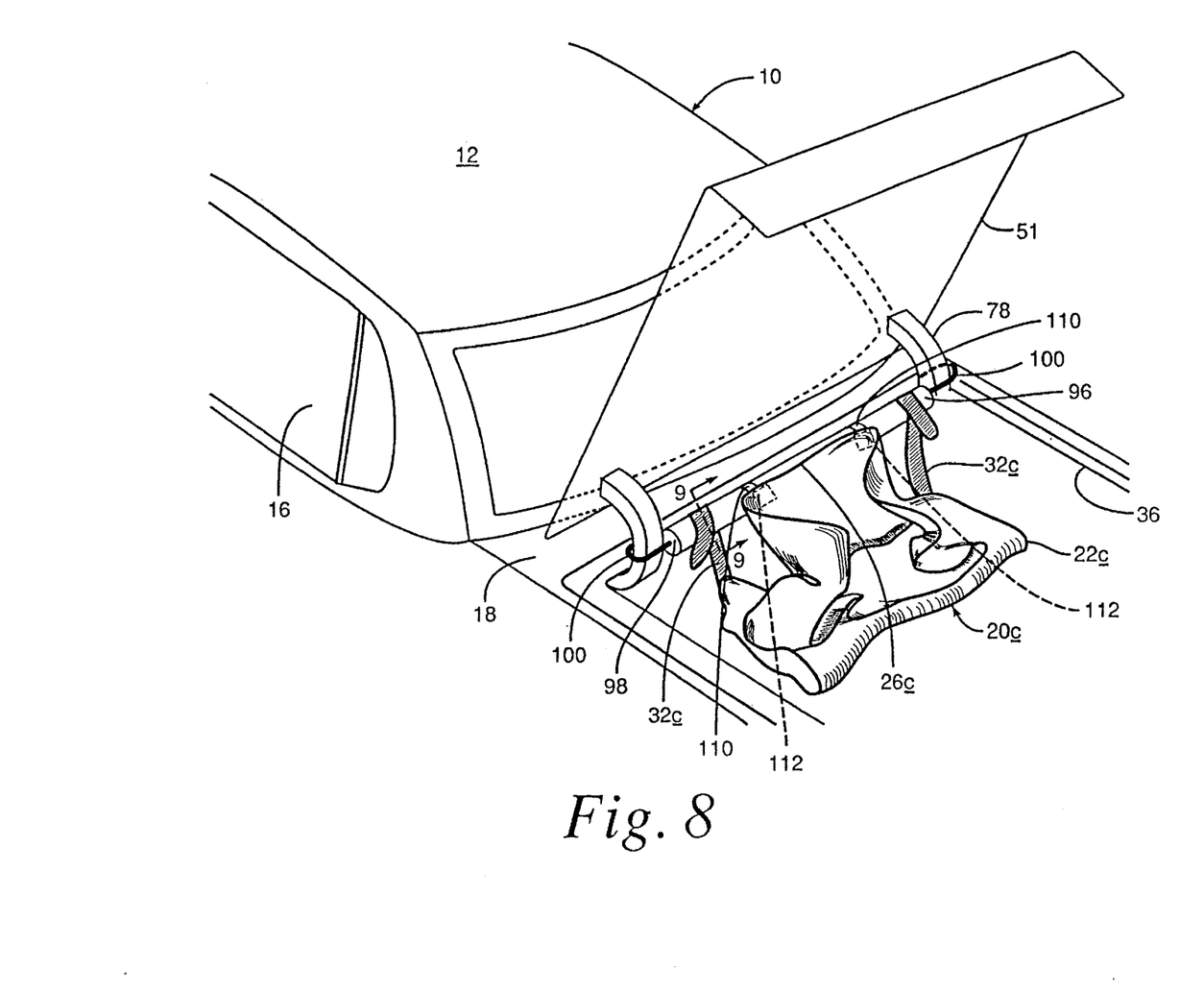
FIG. 8 is a perspective view of another embodiment of a shade cover assembly constructed in accordance with the present invention, shown prior to deployment on a vehicle.
Figure 9:
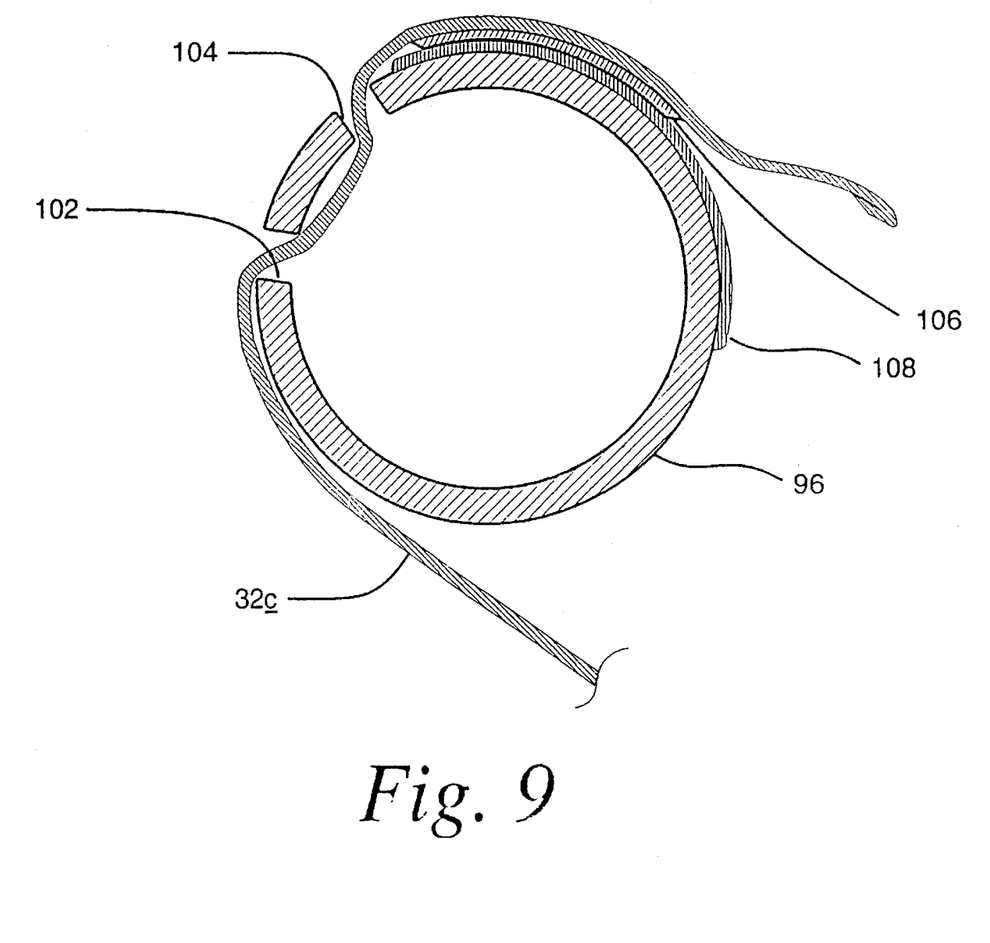
FIG. 9 is a fragmentary, section view taken substantially along line 9—9 in FIG. 8.

A modification of the cover assembly is shown in FIGS. 8 and 9. Several elements, which are substantially similar to those of the previously described embodiment, are identified by the original reference numeral and "c". In this modification, a retaining tube 96 anchors the lower ends of the rear retention members 32c inside the trunk compartment 36, securing the curtain body 22c to the vehicle. An elastic cord 98 having a hook 100 on either end extends through the interior of the tube 96. The hooks 100 are formed for engaging the hinges 78 to releasably mount the retaining tube to the vehicle.

As is shown particularly in FIG. 9, the retaining tube is formed with a pair of spaced slots 102 and 104 on either end of the tube 96. The rear retention member 32c is threaded through the spaced slots 102 and 104 to attach the retention member to the retaining tube. In the preferred form, a hook material fastener 106 and a complementary loop material fastener 108 are respectively provided on the rear retention member 32c and the retaining tube 96. The interengagement between the hook and loop material fasteners further secures the rear retention members 32c to the tube 96. By using the spaced slots and the hook and loop fasteners, the effective length of the rear retention members 32c may be adjusted relative to the vehicle for proper placement of the curtain body over the windows. The retention members 32c may be easily detached from the retaining tube by separating the hook and loop materials 106 and 108 and pulling the members 32c through the spaced slots 102 and 104. The curtain body 22c may thereby be conveniently removed from the retaining tube for cleaning, servicing and any necessary repairs.

The retaining tube further includes hook material fasteners 110 applied toward the middle of the tube 96. Complementary loop material fasteners 112 are attached to the curtain body 22c near the front lower edge 26c. The fasteners 110 and 112 may be coupled together when the curtain body 22c has been pulled into the trunk compartment for storage to secure the front edge of the curtain body to the retaining tube. The front edge of the curtain body 22c is held within convenient reach such that when a user desires to deploy the curtain body, he may easily grab the front edge of the curtain body and feed it through the opening between the trunk lid 51 and the vehicle body. Substantial time is saved since the user need not search through the trunk for the front portion of the curtain body.

Curtain 22c is deployed by passing the front lower edge 26c between the trunk lid 51 and the vehicle body and pulling the curtain across the roof portion 12. As described with the previous modification, the mirror openings are slipped onto the side mirrors 29 and the cord member is aligned relative to the roof. The trunk is then closed, anchoring the rear retention members 32c within the trunk compartment and further securing the cover assembly 20c to the vehicle. The cover assembly is removed for storage by first removing the mirror openings from the vehicle side mirrors. The curtain body 22c is then manually pulled towards the rear of the vehicle and into the trunk compartment 36. The front lower edge 26c may be attached to the retaining tube 96 by interengaging fasteners 110 and 112, conveniently positioning the front portion of the curtain body for future use.

Figure 10:
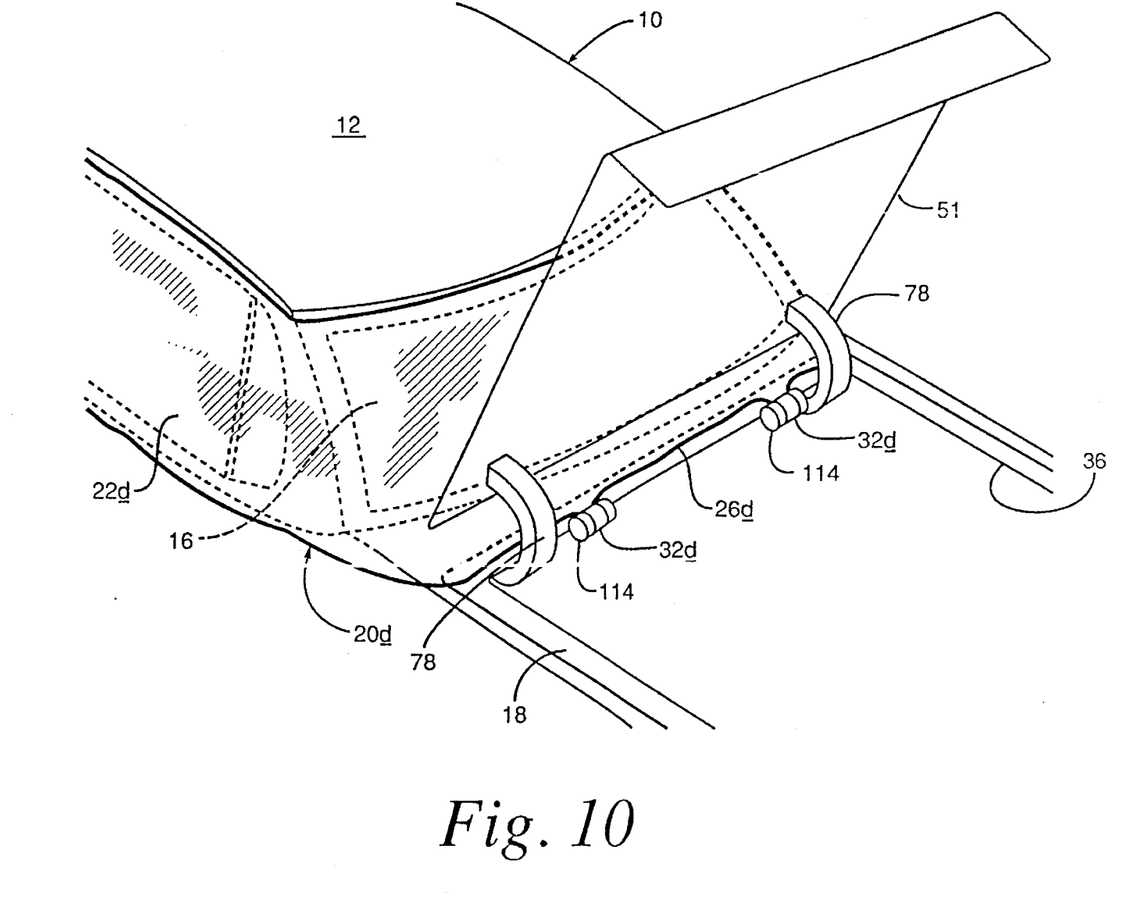
FIG. 10 is a fragmentary, perspective view of an additional embodiment of a shade cover assembly of the present invention, shown in a deployed condition on a vehicle.
Figure 11:
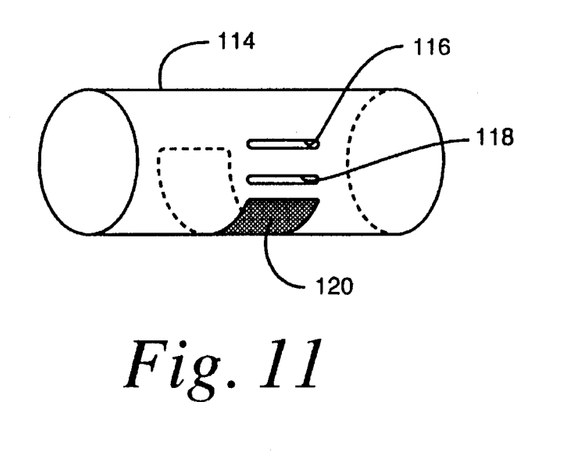
FIG. 11 is an enlarged, perspective view of the retaining tube of the shade cover assembly of FIG. 10.

Another modification of the present invention is shown in FIGS. 10 and 11. The cover assembly is substantially similar to that of the previously described embodiments, with the anchoring means provided in this modification by a pair of retaining tubes 114. Elements of the cover assembly which are similar to those in the previously described embodiments are designated by the reference numeral and "d". Retaining tubes 114 are coupled to the lower edge 26d of the curtain body 22d. The retaining tubes 114 are larger in size than the space between the closed trunk lid 51 and the vehicle body. When the trunk lid is closed, the retaining tubes 114 are held within the trunk compartment, anchoring the retention members 32d to the vehicle and holding the curtain against the windows 16. Securing the retaining tubes within the trunk compartment also provides a deterrence against theft.

In the present modification, the retaining tubes 114 are formed with a pair of spaced slots 116 and 118 (FIG. 11). A hook material fastener 120 is applied to the exterior of the tube, while a complementary loop material fastener (not shown) is secured to the retention strap 32d. The rear retention member is threaded through the slots 116 and 118 and attached to the exterior of the tube by coupling the hook fastener 120 to the loop material fastener. The rear retention members are thereby secured to the retaining members. As with the previously described embodiment, the effective length of the rear retention members 32d may be adapted to the vehicle by adjusting the positioning of the retention members 32d within the spaced slots.

Deployment of cover assembly 20d is substantially similar to that of the previous embodiment, with the user pulling the curtain body 22d through the opening between the trunk lid 51 and the vehicle body and across the roof of the vehicle. Once the mirror openings are slipped onto the side mirrors 29 and the cord member aligned relative to the roof, the trunk lid is closed securing the retaining tubes within the trunk compartment. The retaining tubes 114 anchor the rear retention members 32d inside the trunk compartment and safely secure the curtain body to the vehicle.

Figure 12:
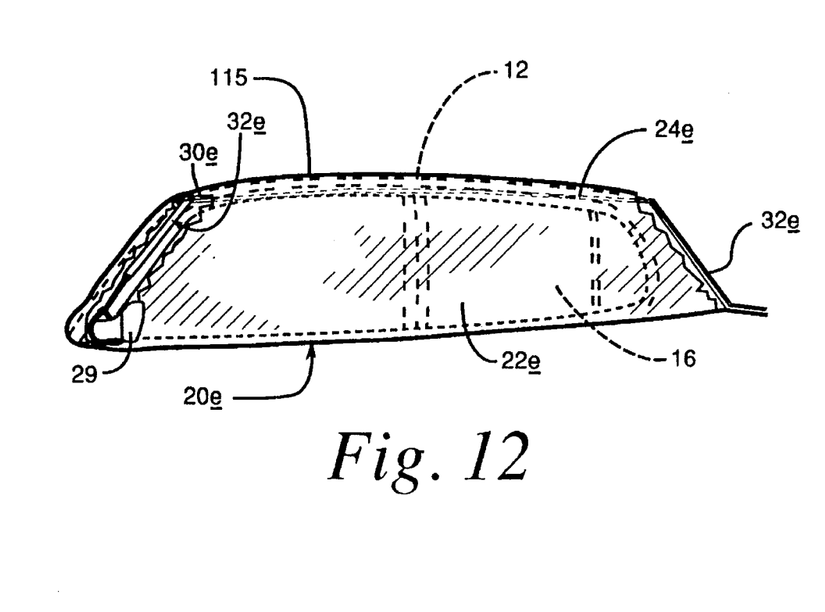
FIG. 12 is a fragmentary side view of another embodiment of a shade cover assembly of the present invention, shown installed on a vehicle with the curtain body partially broken away to reveal the curtain support apparatus.

Another modification of the present invention is shown in FIG. 12. The cover assembly 20e is substantially similar to that of the previously described embodiments, including a curtain body 22e and front and rear retention members 32e. In the present modification, the curtain body 22e includes a roof portion 115 covering the roof portion 12 of the vehicle. A cord member 30e extends substantially around an upper portion 24e to retain the upper portion of the curtain body above the windows 16.

Curtain body 22 is preferably made of a lightweight woven material, such as a ripstop or taffeta-type nylon, which is opaque and/or reflective for optimum sunlight protection. Other materials, such as canvas, polymeric materials or polymeric impregnated materials may also be used. The hook and loop material fasteners of the preferred embodiment may be substituted for other known fastening means. While the present invention has been described in relation to a vehicle having a trunk, it is to be understood that the present invention may also be used with other types of vehicles, such as minivans, station wagons, hatchbacks and the like. When the cover assembly is used with the other vehicles, the anchoring means (the reel assembly 62, retaining tube 96 or retaining tubes 114) may be positioned within the vehicle storage compartment. The cover assembly may also be used with vehicles in which the trunk or storage compartment is located at the front of the vehicle. While the present invention is described as including four retention members, it is to be understood that a cover assembly in accordance with the present invention may include additional, or fewer, retention members. Furthermore, the cover assembly of the present invention may be adapted for use with other structures, such as the superstructure of air or watercraft.

What is claimed is:

1. A shade cover assembly for a vehicle of the type having a roof portion, an upper body portion with a plurality of windows and a lower body portion, said cover assembly comprising:

a curtain body configured for encircling said upper body portion and substantially covering said windows, said curtain body having a front stretch, a back stretch, and side stretches extending between said front stretch and said back stretch, said curtain body having a peripheral upper portion configured to extend around the perimeter of said roof portion when said curtain body is installed on said vehicle, said curtain body further including a peripheral lower edge spaced from said upper portion, and curtain support means for supporting said curtain body in a deployed condition covering said windows when said curtain body is installed on said vehicle, said curtain support means including means for reinforcing said curtain body proximate said upper portion, said reinforcing means extending substantially around said upper portion to define a reinforced region for supporting said curtain body in said deployed position and retaining said upper portion of said curtain body above said windows, said curtain support means further including a plurality of longitudinally extending retention members having a first end coupled to said curtain body adjacent the intersection of adjoining ones of said front stretch, said back stretch and said side stretches and an opposed second end mountable to said vehicle, said retention members each applying a downward-outward directed force to said curtain body proximate said intersection of adjoining ones of said stretches to place said reinforced region of said front stretch, said back stretch and said side stretches of said curtain body under tension and position said curtain-body with said reinforced region substantially aligned with said roof portion of said vehicle.

2. The shade cover assembly of claim 1 wherein, said upper portion comprises an upper edge of said curtain body defining an opening of sufficient size to substantially expose said roof portion when said curtain body is installed on said vehicle, said reinforcing means substantially surrounding said opening to retain said upper edge of said curtain body above said windows.

3. The shade cover assembly of claim 1 wherein, said retention members extend between said upper portion and said lower edge of said curtain body, said first end of said retention member being positioned adjacent said upper portion of said curtain body.

4. The shade cover assembly of claim 1 wherein, said reinforcing means comprises a cord member mounted to said curtain body proximate said upper portion thereof, said cord member being of a length sufficient to substantially surround said perimeter of said roof portion.

5. A shade cover assembly for a vehicle of the type having a roof portion, an upper body portion with a plurality of windows and a lower body portion, said cover assembly comprising:

a curtain body configured for encircling said upper body portion and substantially covering said windows, said curtain body having a peripheral upper portion configured to extend around the perimeter of said roof portion when said curtain body is installed on said vehicle, said curtain body further including a peripheral lower edge spaced from said upper portion, and curtain support means for supporting said curtain body in a deployed condition covering said windows when said curtain body is installed on said vehicle, said curtain support means including means for reinforcing said curtain body proximate said upper portion, said reinforcing means extending substantially around said upper portion to retain said upper portion of said curtain body above said windows, said curtain support means further including a plurality of retention members having a first end and an opposed second end with said first end being coupled to said curtain body and said second end being mountable to said vehicle, said reinforcing means comprising a cord member mounted to said curtain body proximate said upper portion thereof, said cord member being of a length sufficient to substantially surround said perimeter of said roof portion, and means for adjusting the length of said cord member between a maximum length and a minimum length, whereby said reinforcing means is adaptable for installation of said curtain body on said vehicle having one of a plurality of selected sizes.

6. The shade cover assembly of claim 1 wherein, said reinforcing means is substantially inelastic to thereby inhibit deformation of said upper portion of said curtain body when said curtain body is in said deployed condition on said vehicle.

7. The shade cover assembly of claim 1 wherein, said vehicle includes at least one external mirror, and said second end of at least one of said retention members is mountable to said external mirror.

8. The shade cover assembly of claim 1 wherein, said vehicle includes at least one external mirror, and said curtain body includes at least one aperture positioned and dimensioned for insertion of said external mirror through said aperture when said curtain body is installed on said vehicle.

9. The shade cover assembly of claim 8 wherein, said second end of said at least one of said retention members is attached to said curtain body proximate said aperture.

10. The shade cover assembly of claim 1 wherein, at least one of said retention members includes an elastic portion, said elastic portion deforming in response to tensile forces to retain said curtain body in said deployed condition when said cover assembly is installed on said vehicle.

11. The shade cover assembly of claim 1 wherein, at least one of said retention members is resiliently adjustable between a maximum length and a minimum length.

12. The shade cover assembly of claim 1 wherein, said vehicle includes a storage compartment within said vehicle and at least one door member movable between an open position and a closed position to provide access to said storage compartment, and further comprising anchoring means coupled to said curtain body for securing said curtain body to said vehicle when said curtain body is installed on said vehicle, said anchoring means being held within said storage compartment when said curtain body is in said deployed condition.

13. A shade cover assembly for a vehicle of the type having a roof portion, an upper body portion with a plurality of windows, a lower body portion, a storage compartment within said vehicle, and at least one door member movable between a closed position and an open position to provide access to said storage compartment, said cover assembly comprising:

a curtain body configured for extending around said upper body portion of said vehicle to substantially cover said windows, said curtain body having a front stretch, a back stretch, and side stretches extending between said front stretch and said back stretch, said curtain body having first and second peripheral edges and a circumferentially extending support portion, said first peripheral edge defining an opening of sufficient extent to substantially expose said roof portion of said vehicle, said support portion being dimensioned to retain said curtain body on said upper body portion with said first peripheral edge of said curtain body positioned above said windows, a plurality of retention members having a first end and an opposed second end, said first end being secured to said curtain body adjacent the intersection of adjoining ones of said front stretch, said back stretch and said side stretches and said second end being mountable to said vehicle, said retention members at least partially extending between said first and second peripheral edges, said retention members each applying a downward-outward directed force to said curtain body proximate said intersection of said adjoining stretches to place said support portion of said front stretch, said back stretch and said side stretches of said curtain body under tension and retain said curtain body in a deployed position with said support portion substantially aligned with said upper body, and anchoring means coupled to said curtain body for securing said curtain body to said vehicle when installed thereon, which anchoring means is retained within said storage compartment when said curtain body is installed on said vehicle.

14. The shade cover assembly of claim 13, further comprising means for reinforcing said curtain body proximate said opening, said reinforcing means substantially extending around said opening to substantially retain said curtain body in a deployed condition covering said windows.

15. A shade cover assembly for a vehicle of the type having a roof portion, an upper body portion with a plurality of windows, a lower body portion, a storage compartment within said vehicle, and at least one door member movable between a closed position and an open position to provide access to said storage compartment, said cover assembly comprising:

a curtain body configured for extending around said upper body portion of said vehicle to substantially cover said windows, said curtain body having first and second peripheral edges, said first peripheral edge defining an opening of sufficient extent to substantially expose said roof portion of said vehicle, a plurality of retention members having a first end and an opposed second end, said first end being secured to said curtain body and said second end being mountable to said vehicle, said retention members at least partially extending between said first and second peripheral edges, and anchoring means coupled to said curtain body for securing said curtain body to said vehicle when installed thereon, which anchoring means is retained within said storage compartment when said curtain body is installed on said vehicle, at least one of said retention members being connected to said anchoring means for mounting said at least one of said retention members to said vehicle, said at least one of said retention members thereby coupling said anchoring means and said curtain body together.

16. The shade cover assembly of claim 13 wherein, said storage compartment includes an interior, and said anchoring means is mountable to said interior of said storage compartment.

17. The shade cover assembly of claim 13 wherein, said anchoring means comprises a reel member, which reel member is removably mountable to said vehicle, said curtain body winding onto and off of said reel member for storage and deployment of said curtain body.

18. The shade cover assembly of claim 17 wherein, said anchoring means further includes spring means for driving rotation of said reel member to facilitate winding of said curtain body onto said reel member for storage.

19. The shade cover assembly of claim 13 wherein, said anchoring means comprises at least one retaining tube member coupled to said curtain body, said at least one retaining tube member being retained within said storage compartment when said door member is in said closed position, whereby said at least one retaining tube member secures said curtain body to said vehicle when said curtain body is in a deployed condition covering said windows.

20. The shade cover assembly of claim 19 wherein, said storage compartment includes an interior, and said at least one retaining tube member is mountable to said interior of said vehicle for convenient deployment and storage of said curtain body.

21. The shade cover assembly of claim 19 wherein, said anchoring means comprises a second retaining tube member coupled to said curtain body, said at least one retaining tube member and said second retaining tube member being retained within said storage compartment when said door member is in said closed position.

22. The shade cover assembly of claim 13, further comprising handle means mounted to one end of said curtain body for deployment of said curtain body.

23. A shade cover assembly for a vehicle of the type having a roof portion an upper body portion with a plurality of windows, a lower body portion, a storage compartment within said vehicle, and at least one door member movable between a closed position and an open position to provide access to said storage compartment, said cover assembly comprising:

a curtain body configured for extending around said upper body portion of said vehicle to substantially cover said windows, said curtain body having first and second peripheral edges, said first peripheral edge defining an opening of sufficient extent to substantially expose said roof portion of said vehicle, a plurality of retention members having a first end and an opposed second end, said first end being secured to said curtain body and said second end being mountable to said vehicle, said retention members at least partially extending between said first and second peripheral edges, anchoring means coupled to said curtain body for securing said curtain body to said vehicle when installed thereon, which anchoring means is retained within said storage compartment when said curtain body is installed on said vehicle, and handle means mounted to one end of said curtain body for deployment of said curtain body, said handle means being releasably mountable to said anchoring means when said curtain body is in a stored position, said handle means being released from said anchoring means for deployment of said curtain body.

24. The shade cover assembly of claim 13, further comprising means for securing said curtain body in a partially folded position for facilitating deployment and storage of said curtain body.

25. A curtain support apparatus for a shade cover assembly for a vehicle of the type having a roof portion, an upper body portion with a plurality of windows and a lower body portion, said cover assembly comprising a curtain body configured for encircling said upper body portion and substantially covering said windows, said curtain body having a front stretch, a back stretch, and side stretches extending between said front stretch and said back stretch, said curtain body having a peripheral upper portion configured to extend around the perimeter of said roof portion when said curtain body is installed on said vehicle, said curtain body further including a peripheral lower edge spaced from said upper portion, said curtain support apparatus comprising:

means mountable to said curtain body for reinforcing said upper portion of said curtain body, said reinforcing means extending substantially around said upper portion to define a reinforced region for supporting said curtain body in said deployed position and retaining said upper edge of said curtain body above said windows, said reinforcing means comprising a cord member mountable to said curtain body proximate said upper portion thereof, said cord member being of a length sufficient to extend substantially around said upper portion of said curtain body; and a plurality of retention members having a first end and an opposed second end, said first end being coupled to said reinforcing means and said second end being mountable to said vehicle, said first end of said retention members being positioned adjacent the intersection of adjoining ones of said front stretch, said back stretch and said side stretches when said reinforcing means is mounted to said curtain body, said retention members each being configured for applying a downward-outward directed force to said reinforcing means proximate said intersection of adjoining stretches of said curtain body to place said reinforcing means of said front stretch, back stretch, and side stretches under tension and retain said curtain body with said reinforced region substantially aligned with said roof portion of said vehicle.

* * * * *